No. 777,966. PATENTED DEC. 20, 1904.
M. B. LLOYD.
VEHICLE WHEEL.
APPLICATION FILED AUG. 11, 1903.
NO MODEL.
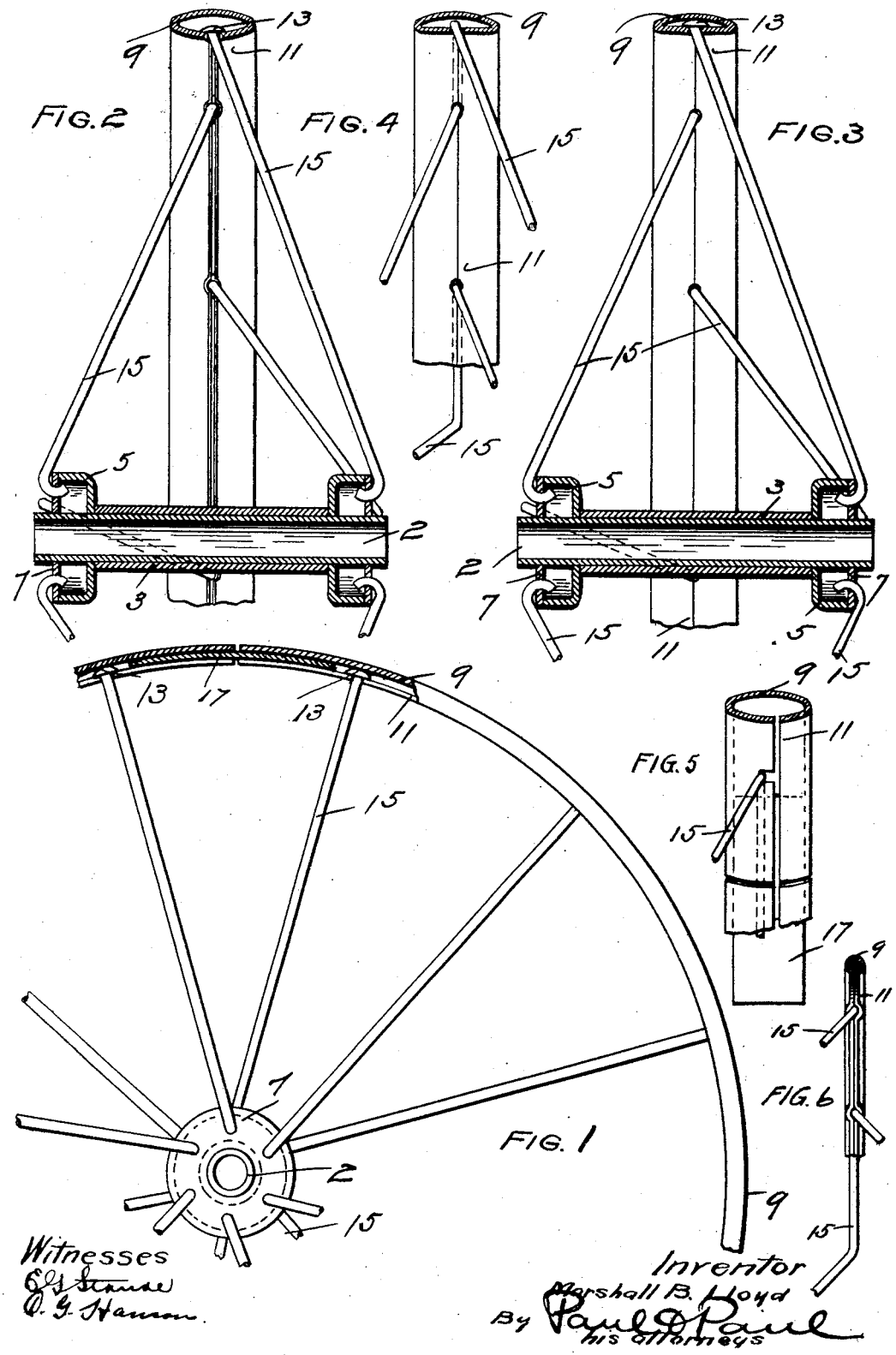

No. 777,966. Patented December 20, 1904.

UNITED STATES PATENT OFFICE.

MARSHALL B. LLOYD, OF MINNEAPOLIS, MINNESOTA.

VEHICLE-WHEEL.

SPECIFICATION forming part of Letters Patent No. 777,966, dated December 20, 1904.

Application filed August 11, 1903. Serial No. 169,070.

*To all whom it may concern:*

Be it known that I, MARSHALL B. LLOYD, of Minneapolis, in the county of Hennepin, State of Minnesota, have invented certain new and useful Improvements in Vehicle-Wheels, of which the following is a specification.

This invention relates to improvements in wheels designed for use upon vehicles of any description or upon various kinds of agricultural machinery. The wheel, owing to its lightness, strength, and cheapness of construction, is particularly adapted for use upon baby-carriages, boys' wagons, doll-carriages, children's velocipedes, and similar articles.

The invention consists generally in a wheel comprising a hub, an outer rim, a series of spokes connecting the hub and the outer rim, and the outer rim being provided with flanges which extend inward and engage the outer ends of the spokes and which being rolled or set down firmly draw all of the spokes tight and make the wheel firm and rigid.

The invention consists, further, in the constructions and combinations hereinafter described, and particularly pointed out in the claims.

In the the accompanying drawings, forming part of this specification, Figure 1 is a side elevation of a portion of a wheel embodying my invention. Fig. 2 is a partial section showing the wheel with the flanges of the rim bent inward and engaging the spokes before the flanges are rolled down to clamp the spokes and draw them tight. Fig. 3 is a view similar to Fig. 2, but showing the flanges rolled down against the main part of the rim, whereby the spokes are firmly clamped and drawn tight. Fig. 4 is a view of a portion of a rim with a modified construction of spoke. Fig. 5 shows a modified arrangement of the flanges of the rim. Fig. 6 shows another modified arrangement of the rim.

As shown in the drawings, the hub of the wheel is preferably composed of a central tube 2, an outer tube 3, somewhat shorter than the central tube, flanged collars 5, that are arranged upon the tube 2, one at each end thereof, so as to bear against the ends of the tube 3, and perforated collars 7, arranged outside of and bearing against the flanged collars 5. The rim of the wheel consists of a band 9, having inwardly-turned flanges 11. These flanges are of such width that when they are turned inward and rolled down against the main part of the rim their edges meet, as shown in Figs. 3 and 4 of the drawings. Recesses are formed in the abutting edges of the flanges to receive the spokes. Suitable spokes 15 extend from the perforated collars 7 to the band 9. These spokes are preferably provided with hooked inner ends to engage the perforated collars 7, and at their outer ends they are provided with enlarged heads 13, which are arranged within the space inclosed by the main portion of the rim 9 and the inturned flanges 11. (See Figs. 2 and 3.) Instead of providing the spokes with the heads 13 I may form the spokes in pairs, each pair being formed from a single piece of metal, the connecting portion extending through the space inclosed between the main part of the rim and the inturned flanges, as indicated by dotted lines in Fig. 4. The recesses for the passage of the spokes instead of being formed partly in one flange and partly in another, as shown in Figs. 2, 3, and 4 of the drawings, may, if preferred, be formed entirely in one flange, in which case the flange having the recesses will be wider than the other flange, as illustrated in Fig. 5 of the drawings.

In constructing the wheel the parts which have been previously formed are assembled as illustrated in Fig. 2 of the drawings. The flanges 11 are then rolled down against the main part of the rim, bringing them into the position shown in Fig. 3 of the drawings, thereby pressing the flanges closely against the main portion of the rim, locking the spokes rigidly in position, and drawing all of the spokes tight and making the wheel firm and solid. Ths ends of the rim abut against each other, and a suitable strip 17 may be inserted in the rim so as to extend across the joint, as shown in Fig. 1, when the flanges of the rim are rolled down upon the main part of the rim, and thereby the inserted strip is secured in position. If preferred, a welded joint in the rim may be employed. Instead of turning in the edges of the rim so that the said edges abut against each other, as already described, I may have the inturned edges lie side by side, as shown in the detailed drawing Fig. 6. In this construction no recesses need be formed in the edges of the rim; but the inturned flanges will conform to the outer surfaces of the spokes where they pass said spokes, and between the spokes said flanges will be pressed closely together, thereby holding the spokes in position. After the wheel is thus constructed it may be dipped in a tinning-bath and the joint between the meeting edges of the flanges will be firmly soldered and the edges of the flanges secured together. The joint between the meeting ends of the rim will also be soldered and secured. The wheel thus constructed is exceedingly simple, inexpensive, and easily constructed. At the same time it is very strong and capable of sustaining a great load. While the wheel is particularly adapted for boys' wagons, baby-carriages, and similar articles, I do not confine myself to any particular use thereof, as it may be employed in a great variety of places. It is especially adapted for use upon hay-rakes and upon various forms of agricultural machinery.

I claim as my invention—

1. The combination, with a suitable hub and a series of spokes having their inner ends connected to said hub, of a rim to which the outer ends of said spokes are connected, said rim being provided with inturned flanges having abutting edges, recesses in the flanges for the passage of the spokes, said flanges being rolled down firmly against the main portion of the rim, whereby said spokes are drawn tight, substantially as described.

2. The combination, with a suitable hub and a series of double spokes having their inner ends connected to said hub, of a rim provided with inturned flanges having abutting edges, recesses in the flanges for the passage of the spokes, the connecting portions of the spokes being arranged between said flanges and the main portion of the rim and said flanges being rolled down firmly against the main portion of the rim, whereby said spokes are drawn tight, substantially as described.

3. The combination, with a suitable hub and a series of spokes having their inner ends connected to said hub, of a rim to which the outer extremities of said spokes are connected, said rim being provided with inturned flanges which are brought against each other and confine the outer extremities of the spokes between the rim and said inturned flanges.

4. The combination, with a suitable hub and a series of spokes having their inner ends connected to said hub, of a rim to which the outer extremities of said spokes are connected, said rim being provided with inturned flanges which embrace the spokes, and each pair of spokes being provided with a connecting portion that lies within the recess formed by said inturned flanges, substantially as described.

In witness whereof I have hereunto set my hand this 20th day of June, 1903.

MARSHALL B. LLOYD.

In presence of—
 A. C. PAUL,
 C. G. HANSON.